(12) United States Patent
Tan et al.

(10) Patent No.: US 8,761,217 B2
(45) Date of Patent: Jun. 24, 2014

(54) MODAL FILTERS FOR MODULATABLE SOURCES

(75) Inventors: Michael Renne Ty Tan, Menlo Park, CA (US); Shih-Yuan Wang, Palo Alto, CA (US); Wayne Victor Sorin, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 95 days.

(21) Appl. No.: 13/441,102

(22) Filed: Apr. 6, 2012

(65) Prior Publication Data
US 2013/0266033 A1    Oct. 10, 2013

(51) Int. Cl.
*H01S 3/098*    (2006.01)
*H01S 3/10*    (2006.01)

(52) U.S. Cl.
USPC ................................ 372/26; 372/18; 372/19

(58) Field of Classification Search
USPC ................................ 372/18, 19, 26
See application file for complete search history.

(56) References Cited

U.S. PATENT DOCUMENTS

| | | | |
|---|---|---|---|
| 4,019,805 A * | 4/1977 | Marcatili et al. ................. | 385/89 |
| 4,723,828 A | 2/1988 | Garel-Jones et al. | |
| 6,185,346 B1 | 2/2001 | Asawa et al. | |
| 6,487,338 B2 | 11/2002 | Asawa et al. | |
| 7,415,175 B2 | 8/2008 | Deliwala | |
| 7,509,004 B2 | 3/2009 | Coleman | |
| 8,055,109 B2 | 11/2011 | Dong et al. | |
| 2004/0013437 A1 | 1/2004 | Wiltsey | |
| 2005/0063712 A1 | 3/2005 | Rice et al. | |
| 2007/0160323 A1 * | 7/2007 | Deliwala ......................... | 385/28 |
| 2009/0092365 A1 | 4/2009 | Donlagic | |
| 2010/0021170 A1 | 1/2010 | Lumineau et al. | |
| 2010/0271689 A1 | 10/2010 | Jasapara | |
| 2011/0058250 A1 | 3/2011 | Liu et al. | |
| 2012/0051084 A1 * | 3/2012 | Yalin et al. .................... | 362/553 |

OTHER PUBLICATIONS

International Searching Authority, The International Search Report and the Written Opinion, Mar. 19, 2012, 12 pages.

\* cited by examiner

*Primary Examiner* — Armando Rodriguez
(74) *Attorney, Agent, or Firm* — Aaron S. Ward

(57) ABSTRACT

A system includes a modulatable source and matched modal filter. The modulatable source is associated with a plurality of source modes to provide a generated signal. The matched modal filter is coupled to the modulatable source to receive the generated signal. Filter modes are to match the source modes. The matched modal filter is coupleable to a link fiber to provide a signal to the link fiber. The filter modes are to match a subset of link fiber modes to couple the plurality of filter modes to the link fiber.

14 Claims, 7 Drawing Sheets

MODAL FILTERS FOR MODULATABLE SOURCES

BACKGROUND

A data link may involve a signal source and a legacy fiber. Coupling the signal source to the legacy fiber may involve a complicated and expensive alignment procedure, and may result in inefficiencies in the data link caused by mismatches between the source and fiber. Furthermore, a length of the data link may be limited based on the legacy fiber and/or the coupling between the source and fiber, resulting in degraded signals having a limited range over the legacy fiber.

BRIEF DESCRIPTION OF THE DRAWINGS/FIGURES

DETAILED DESCRIPTION

Legacy data link fibers may be coupled with a signal source. However, to optimally couple the signal source to the lowest order modes of the link fiber, the link fiber may be associated with an alignment procedure that is time and resource intensive. For example, a signal source may have a different diameter output, e.g., 10 µm, compared to a diameter, e.g., 50 µm, 62.5 µm, or other diameter, of the link fiber. The alignment may involve cumbersome use of a camera at the receiving end of the link fiber to optically verify positioning of the signal source relative to the end of the fiber, and may involve positioning of a lens between the signal source and the link fiber. Furthermore, the link fiber may be associated with generation and propagation of higher-order modes within the link fiber that degrade the signal based on a product of bandwidth and length (BW*L product) associated with the link fiber in view of the generated signal. For example, a 50 GIF OM4 fiber (OM4 defined in TIA-492-AAAD, "Detail specification for 850-nm laser-optimized, 50-µm core diameter/125-µm cladding diameter class Ia graded-index multimode optical fibers of OM4 performance") may have a BW*L (bandwidth-length) product of about 4.7 GHz*km. Accordingly, at modulation and/or data rates of 25 gigabits per second (Gbps), the propagation distance is limited to less than 200 meters.

Examples provided herein enable a link fiber to provide a much larger BW*L product, such as 25 Gbps operation over 500 meters, based on a matched modal filter to match a modulatable source. Proper coupling of the modulatable source, matched modal filter, and/or link fiber may be verified based on a simple power measurement made at the matched modal filter and/or the link fiber. The features may be implemented to preserve backward compatibility with legacy link fiber systems. A system may include a transmitter and a matched modal filter such as a low-order mode spatial filter to be coupled to a multimode fiber (MMF) such as a 50 µm or 62.5 µm graded-index multimode fiber (50 GIF, 62.5 GIF).

Figure 1:
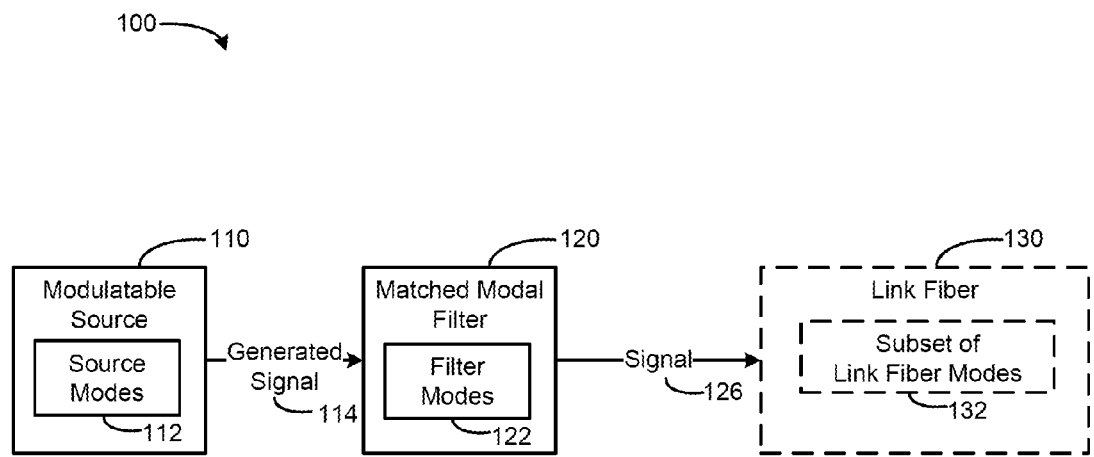
FIG. 1 is a block diagram of a system including a modulatable source and a matched modal filter according to an example.

FIG. 1 is a block diagram of a system 100 including a modulatable source 110 and a matched modal filter 120 according to an example. The modulatable source 110 is associated with source modes 112, and the matched modal filter 120 is associated with filter modes 122. The modulatable source 110 is to provide a generated signal 114 based on the source modes 112. The generated signal 114 is received at the matched modal filter 120. The matched modal filter 120 is to provide a signal 126 based on the generated signal 114 and the filter modes 122. The signal 126 is to be received at link fiber 130. The link fiber 130 is to be associated with a subset of link fiber modes 132.

The modulatable source 110 may include various optical sources, including lasers such as edge emitting lasers, single-mode lasers, high-speed Vertical Cavity Surface Emitting Lasers (VCSELs) having high modulation rates and generating signals at wavelengths such as 780 nanometers (nm), 850 nm, 980 nm, 1060 nm, 1300 nm, and other wavelengths associated with signal sources.

The matched modal filter 120 enables the source modes 112 of the modulatable source 110 to be matched to the subset of link fiber modes 132 of the link fiber 130, enabling efficient coupling of the modulatable source 110 and link fiber 130. For example, the lowest-order modes of the link fiber 130 may be launched without launching higher order modes and without needing cumbersome alignment procedures with the modulatable source 110. The reach of a data link using the matched modal filter 120 and link fiber 130 may be extended due to the large BW*L product associated with the lowest-order modes of the link fiber 130 coupled efficiently to the modulatable source 110 via the matched modal filter 120. The matched modal filter 120 is to attenuate higher order modes, and pass lower order modes, consistent with matching the modulatable source 110, modal filter 120, and link fiber 130 to efficiently couple the modulatable source 110 to the link fiber 130.

The matched modal filter 120 may be a 25 µm, 0.1 radian graded index fiber (25 GIF), and an index profile of the 25 GIF may be chosen to match an index profile of a central core region of the link fiber 130. For example, a 25 GIF patchcord, fiber stub, or pigtail having a curved refractive index profile may be used as a matched modal filter for coupling the modulatable source 110 to the link fiber 130 (e.g., a legacy 50 GIF). The matched modal filter 120 also may be an air-gap connector, such as an air-gap collimated connector having an aperture to allow lowest-order modes to pass while blocking higher-order modes.

As an additional benefit, the matched modal filter 120 enables confirmation of coupling accuracy and the launch/coupling of the lowest order modes from the modulatable source 110 to the link fiber 130 based on performing a simple power measurement. For example, a power measurement may be taken at the output of matched modal filter 120 to receive signal 126 (e.g., using a power meter or other device). The power measurement may be used to verify the coupling link between the modulatable source 110 and the matched modal filter 120. The power measurement may be made at other locations including at the link fiber 130, to verify proper coupling between the modulatable source 110, matched modal filter 120, and/or the link fiber 130. However, a complex camera setup is not needed at the output of the link fiber 130 (e.g., at a receiver) to verify lowest-order mode coupling between the modulatable source 110 and the link fiber 130. Accordingly, it is possible to verify proper coupling at the site of the matched modal filter 120 and/or modulatable source 110, based on a simple power measurement.

Figure 2:
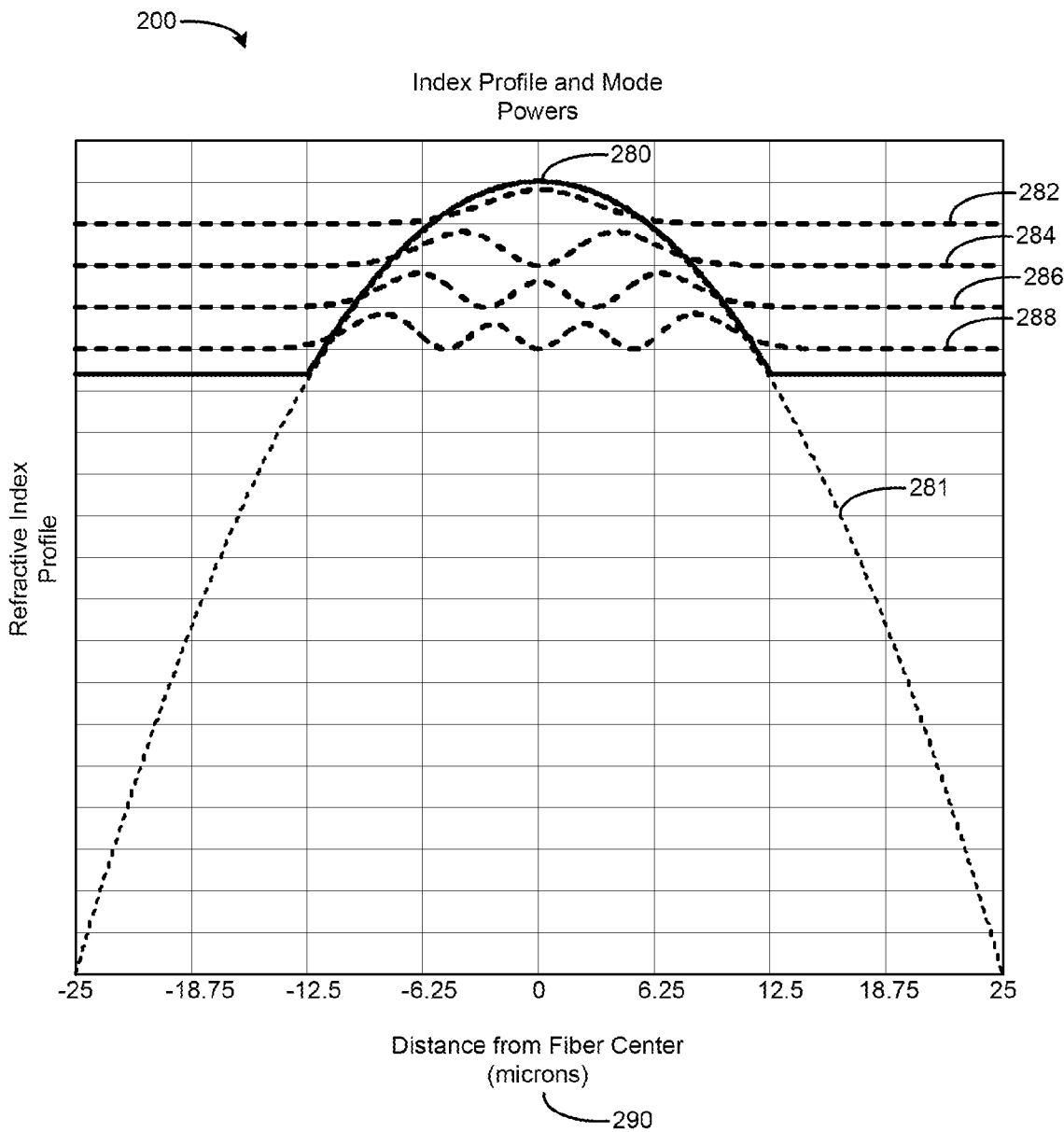
FIG. 2 is a chart of index profiles and mode powers according to an example.

FIG. 2 is a chart 200 of index profiles 280, 281 and mode powers 282, 284, 286, and 288 according to an example. The mode powers 282, 284, 286, and 288 are shown with reference to a distance from fiber center (microns) 290, for a filter spatial refractive index profile 280 and a link fiber spatial refractive index profile 281. The example shown corresponds to a wavelength of approximately 850 nanometers (nm), and the number of modes can be proportional to the wavelength. In an example, the filter spatial refractive index profile 280 corresponds to a 25 GIF being used as the matched modal filter, and the link fiber spatial refractive index profile 281 corresponds to a 50 GIF being used as a link fiber, although other components and/or fibers may be used. Thus, parabolic curvature of the filter spatial refractive index profile 280 ends at a distance of +12.5 μm and −12.5 μm from the 25 GIF fiber center, because the 25 GIF fiber has a diameter of 25 μm. Similarly, parabolic curvature of the link fiber spatial refractive index profile 281 ends at a distance of +25 μm and −25 μm from the 50 GIF fiber center, because the 50 GIF fiber has a diameter of 50 μm. However, in alternate examples, the fiber diameters and corresponding index profiles may be varied to suit a particular application such as a legacy link fiber of 62.5 μm diameter or other diameter, with correspondingly different modes and/or refractive index profile curvatures.

A matched modal filter is to couple a transmitter to a link fiber to launch low-order modes (e.g., 2-6 lowest order one-dimensional Hermite Gaussian modes) from a transmitter into a link fiber. In an example, the matched modal filter may be a 25 μm, 0.1 radian GIF (25 GIF) fiber (e.g., a 25 GIF patchcord or pigtail), whose index profile matches an index profile of a central core region of a 50 GIF link fiber. The matched modal filter also may be an air-gap collimated connector whose aperture passes the lowest-order modes and blocks the higher-order modes. The one-dimensional Hermite Gaussian modes also are referred to herein as "modes," and a number of two-dimensional spatial modes are approximately equal to the square of the number of one-dimensional modes.

As illustrated in FIG. 2, the four modes 282, 284, 286, and 288, associated with the filter spatial refractive index profile 280, are substantially matched to the 4 lowest-order modes associated with the link fiber spatial index profile 281. The filter spatial refractive index profile 280 has a parabolic and/or quadratic profile curvature that is substantially matched to that of the link fiber spatial refractive index profile 281. Although four lowest-order modes are shown, 2-6 lowest order modes may be used in alternate examples. Thus, even a standardized simple fiber connection between the matched modal filter (e.g., 25 GIF and/or air gap connector) and the link fiber (e.g., 50 GIF or 62.5 GIF) can result in exciting and/or launching the 2-6 lowest-order modes of the link fiber, due to the matching between the matched modal filter characteristics and the link fiber characteristics (e.g., their refractive index curvatures or other characteristics). For systems based on the examples herein, with typical mode coupling along a 50 GIF link fiber, the modal dispersion for the four modes illustrated in FIG. 2 will be less than one tenth of the modal dispersion of a legacy 50 GIF not based on the disclosed systems. Thus, an existing legacy 50 GIF may be enhanced to have a bandwidth*length product similar to a 25 GIF based on the disclosed systems.

The modes 282, 284, 286, and 288 are simplified one-dimensional models of the modes contained within a component, such as within the matched modal filter and/or link fiber. Thus, references to "mode" throughout the specification include references to one-dimensional Hermite Gaussian modes. Graphs of the one-dimensional Hermite Gaussian modes have a characteristic symmetric "bell curve" shape including a number of intensity maxima/minima depending on the order of the mode. First mode 282 includes one maximum, second mode 284 includes two maxima separated by a minimum, third mode 286 includes three maxima separated by two minima, and fourth mode 288 includes four maxima separated by three minima. Additional modes may include additional maxima/minima. The higher-order Hermite Gaussian modes associated with the link fiber spatial index profile 281 (e.g., those below the extension of the filter spatial refractive index profile 280) are not shown in FIG. 2.

Figure 3:
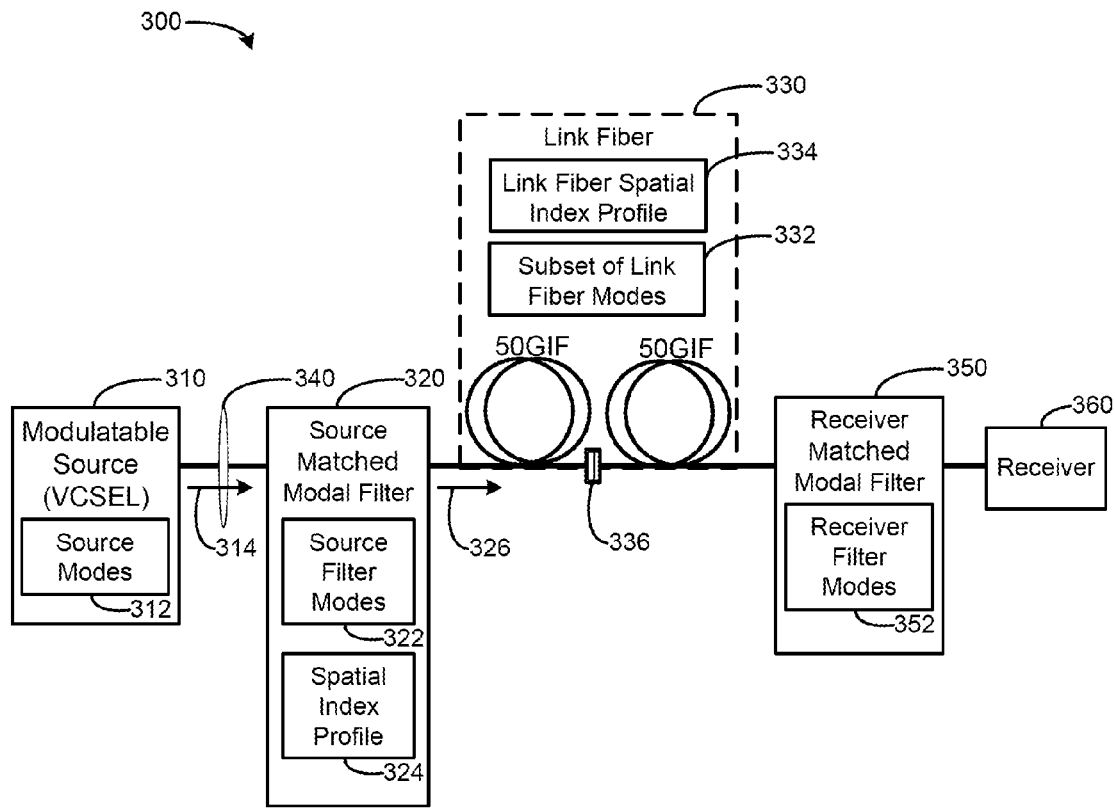
FIG. 3 is a block diagram of a system including a modulatable source and a source matched modal filter according to an example.

FIG. 3 is a block diagram of a system 300 including a modulatable source 310 and a source matched modal filter 320 according to an example. System 300 may include a link fiber 330, receiver matched modal filter 350, and receiver 360. The system 300 also may include a lens 340 to couple the modulatable source 310 to the source matched modal filter 320. The modulatable source 310 is to provide the generated signal 314 based on source modes 312. The source matched modal filter 320 is to receive the generated signal 314 and provide signal 326 based on the generated signal 314, source filter modes 322, and spatial index profile 324. The signal 326 is received at the link fiber 330. The link fiber 330 is associated with a subset of link fiber modes 332, a link fiber spatial index profile 334, and a connector 336. The link fiber is coupled to the receiver matched modal filter 350 associated with receiver filter modes 352. The receiver matched modal filter 350 is coupled to receiver 360. The example of FIG. 3 shows a receiver matched modal filter 350, although in alternate examples the receiver matched modal filter 350 may be omitted. The receiver matched modal filter 350 may remove higher order modes associated with longer propagation delays compared to the lower order modes resulting in reduced bandwidth. Omitting the receiver matched modal filter 350 may enable collection of greater signal power including the higher order modes, although a lower bandwidth may potentially result due to the delayed higher order modes.

Modulatable source 310 may be a high-speed Vertical Cavity Surface Emitting Laser (VCSEL) to provide the generated signal 314 based on source modes 312. Accordingly, the source filter modes 322 of the source matched modal filter 320 may be chosen to match the source modes 312 of the modulatable source 310, thereby allowing for 100% coupling efficiency and maximizing the BW*L product for the signal 326 propagating through multimode link fiber 330. Thus, the source matched modal filter 320 (and other components, such as connector 336, receiver matched modal filter 350, etc.) may be matched based on modes.

The source matched modal filter 320 (and other components, such as connector 336, receiver matched modal filter 350, etc.) may be matched to the link fiber 330 based on refractive index. For example, the source matched modal filter 320 may include a refractive index curvature that is parabolic (e.g., a quadratic index profile). The spatial index profile 324 of the source matched modal filter 320 may be matched to the link fiber spatial index profile 334 of the link fiber 330. In an example, the spatial index profile 324 of the source matched modal filter 320 and the link fiber spatial index profile 334 are associated with refractive indexes of substantially equal parabolas. Matching components may enable coupling of the components based on standard connections. For example, a 25 GIF source matched modal filter 320 may be butted together with a 50 GIF link fiber 330, without special adapters therebetween, when the source filter modes 322 match the subset of link fiber modes 332, and/or the spatial index profile 324 of the source matched modal filter 320 matches the link fiber spatial index profile 334 (e.g., matching refractive index curvatures). Similarly, other components (such as receiver matched modal filter 350, receiver 360, etc.) may be coupled efficiently without use of complicated connectors.

Connector 336 may be used to couple various components including sources, filters, fibers, receivers, etc. Connector 336 may be a standard fiber connector to couple together portions of fiber, such as source matched modal filter 320 and/or link fiber 330. Connector 336 may be a low-order mode spatial filter that may be periodically placed along the link fiber 330 or other portions of the system 300, to enable high bandwidth-length (BW*L) modes to travel along the link fiber 330, and to remove any undesirable higher-order modes generated in a fiber to ensure a high BW*L link. Thus, a legacy 50 μm graded-index multimode fiber (50 GIF) link may be provided with extended bandwidth-length, and the source matched modal filter 320 enables excitation and launching of the corresponding subset of link fiber modes 332 in the link fiber 330. The connector 336 may be a matched modal filter, such as a source matched modal filter 320 and/or a receiver matched modal filter 350.

The source matched modal filter 320 and the modulatable source 310 may be coupled together based on a lens 340 to enable use of different diameter modulatable source 310 and source matched modal filter 320. The lens 340 may adjust a diameter of the generated signal 314 from the modulatable source 310 to match a diameter of the source matched modal filter 320. For example, the lens 340 may change the diameter of the source modes 312 to match a diameter of the source filter modes 322, so that the generated signal 314 includes the same number of modes, and the modulatable source 310 and the source matched modal filter 320 are spatially matched. Although shown separately in FIG. 3, the lens 340 may be integrated with the source matched modal filter 320 and/or the modulatable source 310.

The link fiber 330 may generate higher-order modes when propagating the signal 326. The receiver matched modal filter 350 may remove any undesirable higher-order modes (e.g., generated in the link fiber 330 or elsewhere) from reaching the receiver 360, ensuring a high BW*L link. The link fiber 330 may be a length of over a kilometer and even less than a meter. For example, systems including the source matched modal filter 320 also may include a link fiber approximately a meter in length, for use with backplane applications to link components of a computing system such as a server.

The receiver 360 may be backwards compatible with previous generation links, e.g., may accept legacy connections such as 50 GIF and/or 62.5 GIF. The receiver 360 may be coupled to example systems described herein based on the receiver matched modal filter 350. The receiver matched modal filter 350 may be a 25 GIF or other low-order spatial filter such as a connector having an aperture (e.g., air gap connector) to filter out higher-order modes. For example, the receiver matched modal filter 350 may filter out all but 2-6 of the lowest order modes. Thus, example systems do not impose cumbersome requirements on the receiver 360, and receiver matched modal filter 350 enables increased flexibility for alignment and coupling.

Systems described herein may include arrays of modulatable sources 310, lenses 340, source matched modal filters 320, link fibers 330, connectors 336, receiver matched modal filters 350, and/or receivers 360. For example, a multi-fiber array of link fibers 330 may be associated with array-based connectors 336, and may be coupled to an array-based modulatable source 310 including multiple different data links carried along multiple channels.

Figure 4:
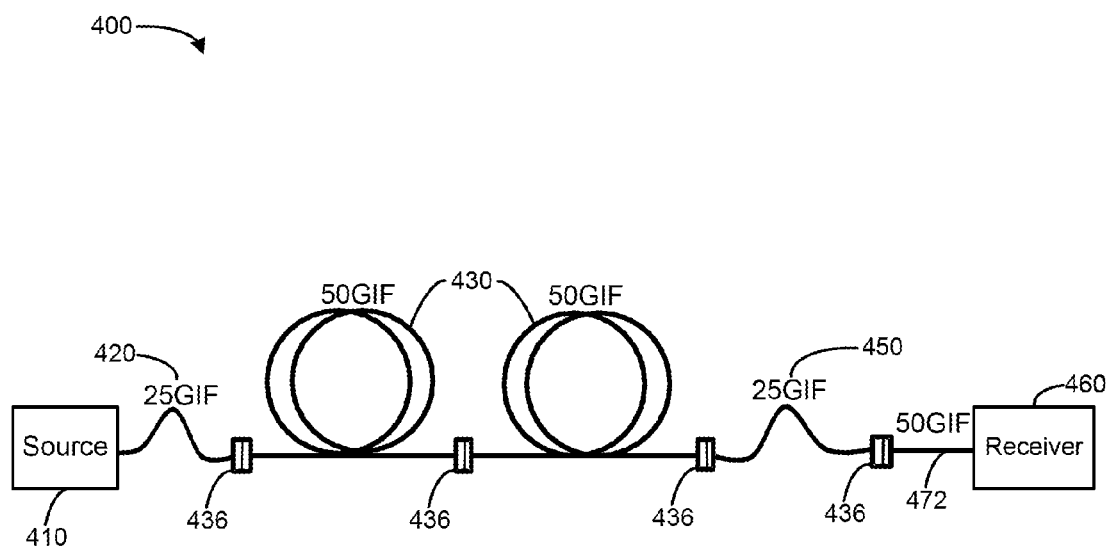
FIG. 4 is a block diagram of a system including a source coupled to a source matched modal filter according to an example.

FIG. 4 is a block diagram of a system 400 including a source 410 coupled to a source matched modal filter 420 according to an example. The source matched modal filter 420 (e.g., a 25 GIF) is coupled to a link fiber 430 (e.g., a 50 GIF, 62.5 GIF, or other legacy fiber such as fiber infrastructure for data links). The link fiber 430 is coupled to a receiver matched modal filter 450 (e.g., a 25 GIF). The receiver matched modal filter 450 is coupled to receiver 460 via connector fiber 472. Components may be coupled based on connectors 436. Source matched modal filter 420 and receiver matched modal filter 450 are shown as 25 GIF, and link fiber 430 and connector fiber 472 are shown as 50 GIF, although other types of components may be used.

System 400 shows fibers (e.g., 25 GIF) used as the source matched modal filter 420 and the receiver matched modal filter 450. Furthermore, receiver 460 is shown using connector fiber 472 of 50 GIF, although other types of connector fiber 472 may be used. In an example, the connector fiber 472 is a pigtail associated with receiver 460. In alternate examples, the connector fiber 472 may be integrated within the receiver 460, and may be omitted such that the receiver 460 is directly coupled to another fiber and/or connector, including examples where the receiver 460 is integrated with a connector to receive a link fiber and/or matched modal filter. Use of fibers enables simple connectors 436 to be used, for coupling the source 410 to the link fiber 430 and the receiver 460. Thus, system 400 illustrates an example of efficiently coupling a source 410 to a legacy link fiber 430, using a backward compatible receiver 460. The receiver 460 is backward compatible because it is coupleable directly to a legacy fiber such as 50 GIF (or 62.5 GIF) based on the connector fiber 472 (shown as 50 GIF, but connector fiber 472 may be other types of fiber to match other legacy fibers such as 62.5 GIF). The receiver matched modal filter 450 enables efficient coupling to the connector fiber 472 and the receiver 460.

Figure 5:
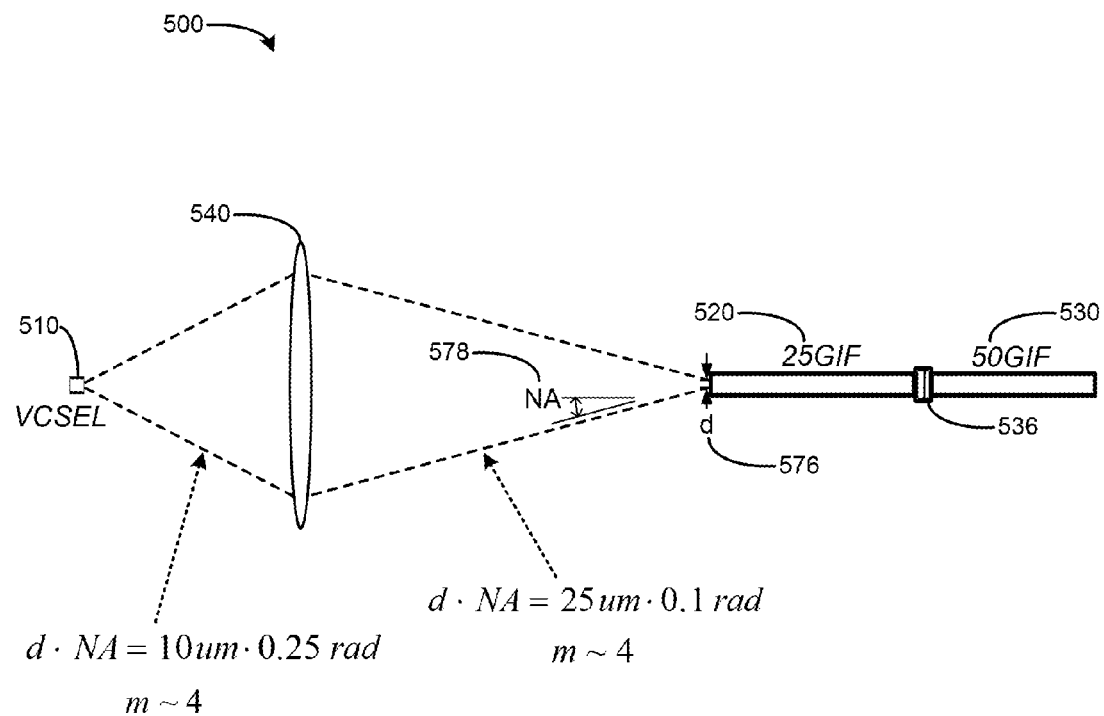
FIG. 5 is a block diagram of a fiber assembly including a lens according to an example.

FIG. 5 is a block diagram of a fiber assembly 500 including lens 540 according to an example. A modulatable source 510 (e.g., a VCSEL) is coupled to the assembly 500 via a lens 540 and a matched modal filter 520 (e.g., a 25 GIF), and the assembly 500 is coupled to a link fiber 530 (e.g., a 50 GIF). For example, the matched modal filter 520 is coupled to link fiber 530 via connector 536. The fibers may be connected based on a butt connection where matched modal filter 520 is butted against link fiber 530. The assembly 500 may use lens 540 to couple the modulatable source 510 and link fiber 530, although other techniques may be used to couple the modulatable source 510 and other components. The fiber assembly 500 is associated with a diameter d 576 and numerical aperture NA 578.

The matched modal filter 520 is shown as a 25 GIF, and the link fiber 530 is shown as a 50 GIF, although other types of fibers may be used. For example, fibers based on compatible combinations of d and NA for d*NA products may be used, regarding d*NA of the modulatable source 510, matched modal filter 520, and at least a portion of link fiber 530. For example, the modulatable source 510 may be associated with approximately 4 modes, based on a product of diameter and numerical aperture d*NA of 10 μm*0.25 radian, at a wavelength of approximately 850 nm (e.g., corresponding to a wavelength of light emitted from VCSEL source 510). The lens 540 enables an air gap in the fiber assembly 500, and coupling to the matched modal filter 520. The matched modal filter 520 is to filter out any higher modes of the modulatable source 510, if applicable, and efficiently couple those modes to the link fiber 530. Specifically, the matched modal filter 520, shown in FIG. 5 as the 25 GIF fiber, efficiently couples approximately four of the lowest order modes to the link fiber 530, based on a product of diameter and numerical aperture d*NA of 25 μm*0.1 radian for the 25 GIF. The diameter d 576 and the numerical aperture NA 578 may be chosen to provide approximately 2-6 of the lowest order modes to the link fiber 530. Thus, the matched modal filter 520 may be a fiber other than the 25 GIF as shown, including a 30 GIF or 20 GIF etc. The actual diameter d 576 may include a range of values, along with a range of values for numerical aperture NA 578 (and, thus, the d*NA product). In an example, d 576 and NA 578 may be increased slightly in view of handling bending losses.

A product of bandwidth and length (BW*L product) associated with a data link may be extended based on the components described herein. A matched modal filter, such as the fiber assembly 500 of FIG. 5, may extend the BW*L product based on a d*NA product associated with a reduced numerical aperture. For example, the BW*L product is proportional to a bit rate and length (BR*L product). For the examples described herein, the bit rate BR*L product is related to the numerical aperture NA of the graded index link fiber 530, as follows:

$$BR \cdot L \propto \frac{1}{NA^4}$$

As shown in the equation above, at a given bit rate BR the propagation length L is inversely proportional to the $4^{th}$ power of the numerical aperture NA. Thus, a 2× decrease of the NA, e.g., from 0.2 rad to 0.1 rad, can potentially increase the BR*L product (and thus an associated BW*L product) by 16×. In an example, for NA=0.2 rad, BR·L~2.3 Gbps·km at a wavelength of approximately 850 nm. For NA=0.1 rad, BR·L~35 Gbps·km at a wavelength of approximately 850 nm. Although filtering in FIG. 5 is based, at least in part, on a fiber, other techniques may be used for filtering, including a lens/aperture assembly or diffractive element such as a holographic diffraction pattern and the like.

Figure 6:
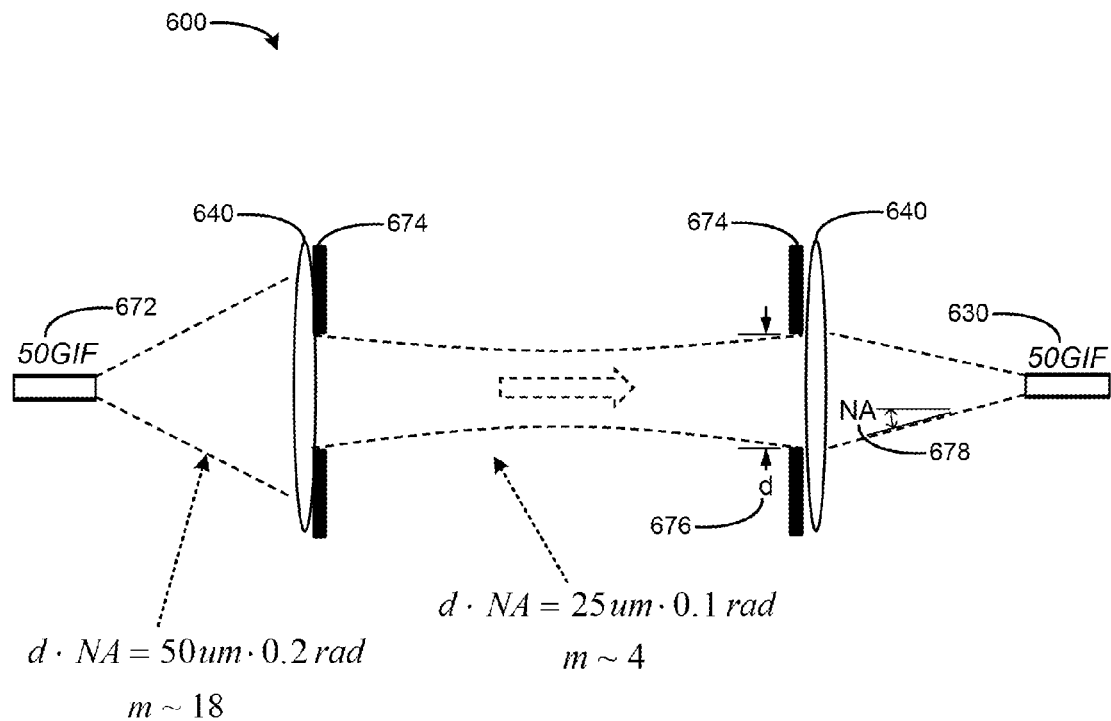
FIG. 6 is a block diagram of an air gap connector assembly including a lens and aperture according to an example.

FIG. 6 is a block diagram of an air gap connector assembly 600 including lens 640 and aperture 674 according to an example. A connector fiber 672 is coupled to the assembly 600, and the assembly 600 is coupled to a link fiber 630. The assembly may use a collimated signal based on lenses 640 and apertures 674. The air gap connector assembly 600 is associated with a diameter d 676 and numerical aperture NA 678.

The connector fiber 672 is shown as a 50 GIF, although other types of fibers may be used. The connector fiber 672 is associated with approximately 18 modes, based on a product of diameter and numerical aperture d*NA of 50 μm*0.2 radian. The lenses 640 and apertures 674 enable the air gap connector assembly 600 to filter out approximately 14 higher modes of the approximately 18 modes associated with the connector fiber 672. Specifically, the air gap connector assembly 600 shown in FIG. 6 passes approximately four of the lowest order modes to the link fiber 630, based on a product of diameter and numerical aperture d*NA of 25 μm*0.1 radian. The diameter d 676 and the numerical aperture NA 678 may be chosen to provide approximately 2-6 of the lowest order modes to the link fiber 630. The actual diameter d 676 may include a range of values, along with a range of values for numerical aperture NA 678 (and, thus, the d*NA product). In an example, d 676 and NA 678 may be increased slightly in view of handling bending losses. Although two matched lenses 640 and two matched apertures 674 are shown, the lenses 640 and/or the apertures 674 may differ or otherwise be unmatched from each other. For example, first and second lenses may be used with first and second apertures.

Figure 7:
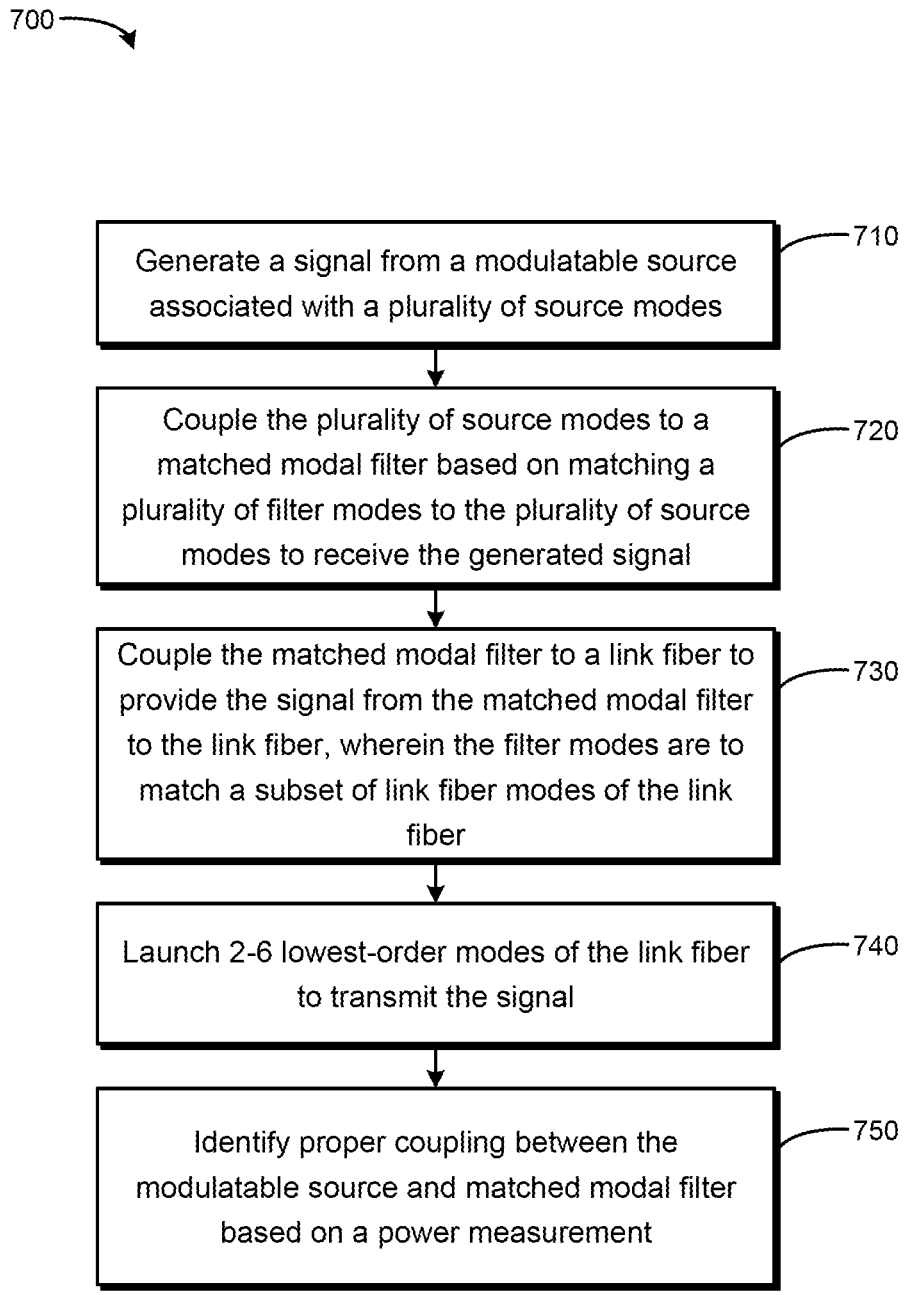
FIG. 7 is a flow chart based on a modulatable source and matched modal filter according to an example.

FIG. 7 is a flow chart 700 based on a modulatable source and matched modal filter according to an example. In block 710, a signal is generated from a modulatable source associated with a plurality of source modes. For example, the modulatable source may be a Vertical Cavity Surface Emitting Laser (VCSEL). In block 720, the plurality of source modes are coupled to a matched modal filter based on matching a plurality of filter modes to the plurality of source modes to receive the generated signal. For example, the matched modal filter may be a 25 GIF fiber, an air gap connector, or other filter. In block 730, the matched modal filter is coupled to a link fiber to provide the signal from the matched modal filter to the link fiber, wherein the filter modes are to match a subset of link fiber modes of the link fiber. For example, the filter modes are to match based on the lowest 2-6 one-dimensional Hermite Gaussian modes of the link fiber. The filter modes also may match based on parabolic curvature of refractive index profiles, such as a match between a 25 GIF fiber filter and a 50 GIF link fiber. In block 740, 2-6 lowest-order modes of the link fiber are launched to transmit the signal. For example, the modes are launched based on excitation at the link fiber caused by a signal emitted by a mode filter. In block 750, proper coupling between the modulatable source and matched modal filter is identified based on a power measurement. The power measurement may be taken at the matched modal filter, for example.

What is claimed is:

1. A system comprising:
  a modulatable source associated with a plurality of source modes to provide a generated signal; and
  a matched modal filter coupled to the modulatable source to receive the generated signal, wherein a plurality of filter modes associated with the matched modal filter are to match the plurality of source modes to couple the plurality of source modes to the matched modal filter; wherein the matched modal filter is coupleable to a link fiber to provide a signal to the link fiber, wherein the filter modes are to match a subset of link fiber modes associated with the link fiber to couple the plurality of filter modes to the link fiber, and wherein the filter modes comprise at least 4 lowest-order one-dimensional Hermite Gaussian modes corresponding to at least 4 lowest-order one-dimensional Hermite Gaussian modes of the link fiber.

2. The system of claim 1, wherein the matched modal filter comprises a spatial index to match a spatial index associated with the link fiber.

3. The system of claim 1, wherein the matched modal filter comprises a multi-mode Graded-Index Fiber (GIF) including a substantially parabolic spatial refractive index profile.

4. The system of claim 1, wherein the matched modal filter comprises an air-gap collimated connector assembly including a connector fiber, lens, and aperture.

5. The system of claim 1, wherein the matched modal filter comprises a diameter d of approximately 25 microns, a numerical aperture NA of approximately 0.1 radians, and a parabolic refractive index.

6. The system of claim 1, wherein the matched modal filter is to spatially match the modes of the modulatable source with the use of a lens to adapt a diameter of the modulatable source with a diameter of the matched modal filter.

7. The system of claim 1, further comprising a receiver matched modal filter coupleable to the link fiber, including receiver filter modes to match the source modes and the subset of link fiber modes.

8. The system of claim 1, wherein the modulatable source includes a Vertical Cavity Surface Emitting Laser (VCSEL).

9. A method, comprising:
generating a signal from a modulatable source associated with a plurality of source modes; and
coupling the plurality of source modes to a matched modal filter based on matching a plurality of filter modes to the plurality of source modes to receive the generated signal;
wherein the matched modal filter is coupleable to a link fiber to provide a signal from the matched modal filter to the link fiber, and the filter modes are to match a subset of link fiber modes of the link fiber; wherein the filter modes comprise at least 4 lowest-order one-dimensional Hermite Gaussian modes corresponding to at least 4 lowest-order one-dimensional Hermite Gaussian modes of the link fiber.

10. The method of claim 9, further comprising launching the at least 4 lowest-order modes of the link fiber to transmit the signal.

11. The method of claim 9, further comprising identifying proper coupling between the modulatable source and matched modal filter based on a power measurement.

12. A system, comprising:
a modulatable Vertical Cavity Surface Emitting Laser (VCSEL) source to provide a generated signal based on a plurality of source modes;
a source matched modal filter associated with a plurality of source filter modes to match the plurality of source modes, the source matched modal filter coupled to the modulatable source to receive the generated signal and provide a signal from the source matched modal filter;
a link fiber, coupled to the source matched modal filter to receive the signal, associated with a subset of link fiber modes to match the plurality of source filter modes and the plurality of source modes, wherein the source matched modal filter includes a spatial index profile to match a link fiber spatial index profile, and wherein the filter modes comprise at least 4 lowest-order one-dimensional Hermite Gaussian modes corresponding to at least 4 lowest-order one-dimensional Hermite Gaussian modes of the link fiber; and
a receiver matched modal filter coupled to the link fiber, including a plurality of receiver filter modes to match the plurality of source modes and the subset of link fiber modes.

13. The system of claim 12, further comprising an air gap connector to connect the link fiber to propagate the signal.

14. The system of claim 12, wherein the link fiber is utilized in a backplane of a computing system using an air gap connector.

* * * * *